United States Patent
Lin et al.

(10) Patent No.: US 11,394,706 B2
(45) Date of Patent: Jul. 19, 2022

(54) PASSWORD-LESS LOGIN

(71) Applicant: Seagate Technology LLC, Cupertino, CA (US)

(72) Inventors: Jiangnan Lin, Singapore (SG); Xiong Liu, Singapore (SG); Wendy Pui Lai Wong, Singapore (SG); Padmaja Kannan, Singapore (SG); Manuel Offenberg, South Lake Tahoe, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 144 days.

(21) Appl. No.: 16/559,348

(22) Filed: Sep. 3, 2019

(65) Prior Publication Data
US 2021/0067509 A1 Mar. 4, 2021

(51) Int. Cl.
*H04L 29/06* (2006.01)
*H04L 9/40* (2022.01)
*H04L 9/32* (2006.01)

(52) U.S. Cl.
CPC ........ *H04L 63/0861* (2013.01); *H04L 9/3278* (2013.01); *H04L 63/0876* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 6,766,454 B1 * | 7/2004 | Riggins | H04L 63/0838 713/185 |
| 7,949,881 B2 * | 5/2011 | Imura | G07C 9/33 713/186 |
| 8,312,291 B2 * | 11/2012 | Golic | H04L 9/0866 713/186 |
| 8,620,666 B1 * | 12/2013 | Whitmore | G10L 15/083 704/273 |
| 2002/0174180 A1 * | 11/2002 | Brown | G06F 16/1787 709/203 |
| 2010/0289627 A1 | 11/2010 | McAllister et al. | |
| 2013/0318359 A1 * | 11/2013 | Morris | G06F 21/6245 713/185 |
| 2015/0278498 A1 * | 10/2015 | Hong | G06F 21/32 340/5.82 |
| 2016/0162671 A1 * | 6/2016 | Baca | G06K 9/00892 382/115 |
| 2017/0064555 A1 | 3/2017 | Johansson et al. | |
| 2017/0346644 A1 | 11/2017 | Cambou | |
| 2018/0019882 A1 | 1/2018 | Watanabe | |
| 2018/0063715 A1 | 3/2018 | Johansson et al. | |
| 2018/0326291 A1 | 11/2018 | Tran | |

* cited by examiner

*Primary Examiner* — Piotr Poltorak
(74) *Attorney, Agent, or Firm* — Holzer Patel Drennan

(57) ABSTRACT

The technology disclosed herein provides a system for allowing users to login into one or more devices without a password. Implementations of the system include one or more biometric data collection devices (shoe, glasses, watch) and a device configured to store one or more user identification data, receive a request for user verification, request user's biometric data from one or more of the biometric data collection devices, generate a personal unclonable function (PUF) value based on combination of at least one of the user identification data and the user's biometric data, and verify the user's identity by comparing the PUF value to the user's PUF benchmark.

17 Claims, 6 Drawing Sheets

PASSWORD-LESS LOGIN

BACKGROUND

A password is a string of characters used for user authentication to prove identity or access approval to gain access to resource such as PC, Laptop, external drive, etc. For security reasons, users are generally required to enter their password for devices and/or systems. Furthermore, many systems require users to often change their password at predetermined intervals. Given the large number of devices and systems used by modern consumers, they end up remembering a large number of different passwords. Often the users use the same or simple passwords, such as date of birth, etc., for login and these in fact makes the password based login to systems and devices less secure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a technology disclosed herein provides a system for allowing users to login into one or more devices without a password. Implementations of the system include one or more biometric data collection devices (shoe, glasses, watch) and a device configured to store one or more user identification data, receive a request for user verification, request user's biometric data from one or more of the biometric data collection devices, generate a personal unclonable function (PUF) value based on combination of at least one of the user identification data and the user's biometric data, and verify the user's identity by comparing the PUF value to the user's PUF benchmark.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide system for allowing users to login into one or more devices without a password. Implementations of the system include one or more biometric data collection devices (shoe, glasses, watch) and a device configured to store one or more user identification data, receive a request for user verification, request user's biometric data from one or more of the biometric data collection devices, generate a personal unclonable function (PUF) value based on combination of at least one of the user identification data and the user's biometric data, and verify the user's identity by comparing the PUF value to the user's PUF benchmark.

Figure 1:
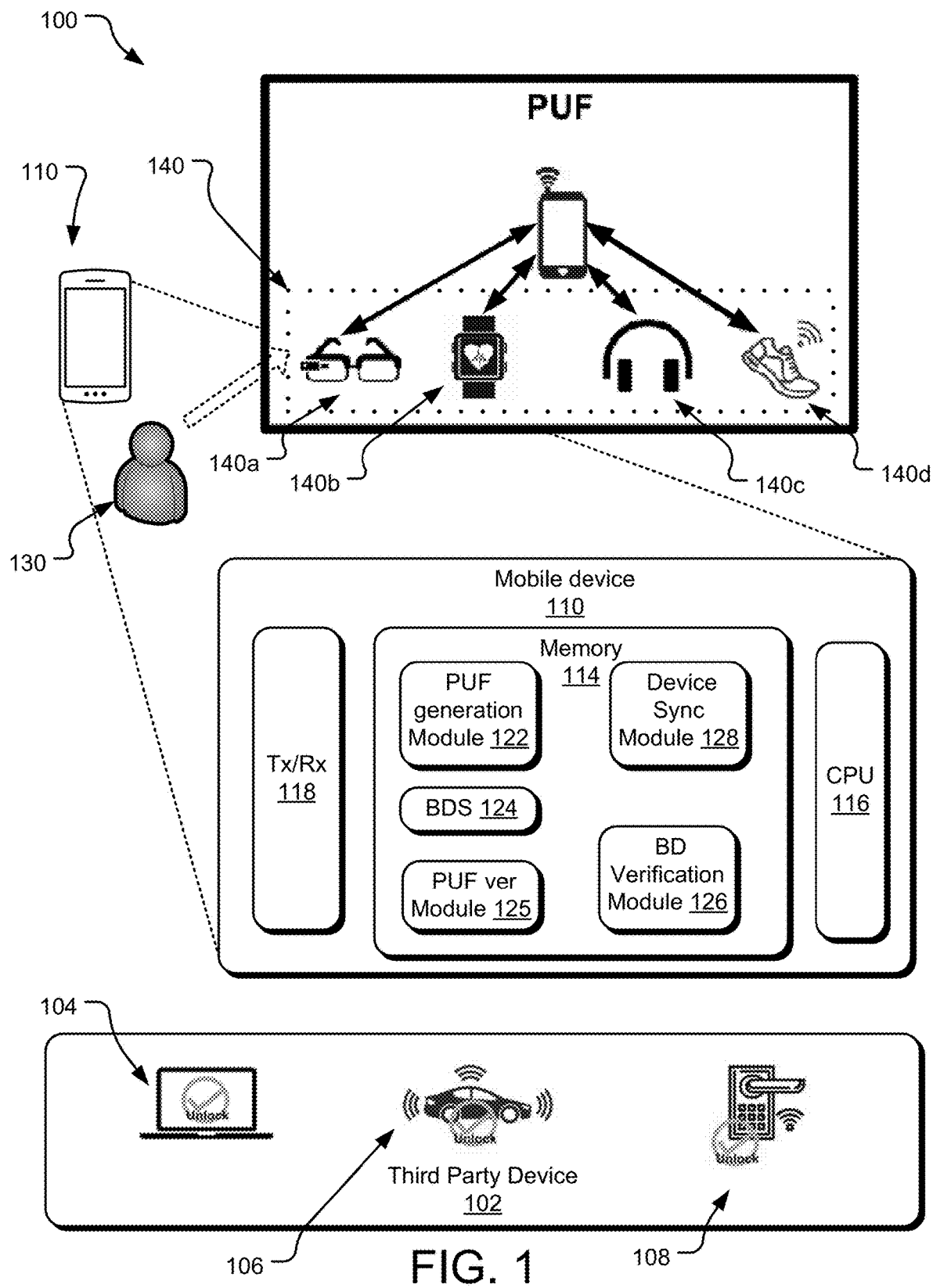
FIG. 1 illustrates an example block diagram of an example system that allows a user to log in without a password.

FIG. 1 illustrates an example block diagram of an example password-less login system 100 that allows a user to log in without a password. The password-less login system 100 for a user 130 may be implemented using a user 130's mobile device 110, such as a mobile phone, a tablet device, etc. The mobile device 110 may include a memory 114 for storing various operations and data that can be used for implanting the password-less login system 100. For example, the memory 114 may include a personal unclonable function (PUF) generation module 122 that can be used to generate a PUF for the user 130 using various biometric data about the user 130. In one implementation, the PUF generation module may generate a personal unclonable function (PUF) value based on combination of at least one of the user identification data and the user's biometric data.

In one implementation, the mobile device 110 may communicate using a transmitter/receiver (Tx/Rx) module 118 to communicate with various biometric data generating objects 140 of the user 130 to collect various biometric data about the user 130. For example, the biometric data generating objects 140 of the user 130 may include a pair of glasses 140a, a watch 140b, a headphone device 140c, shoes 140d, etc. In one implementation, each of these biometric data generating objects 140 collect various biometric data about the user 130 and communicate such biometric data via a transmitter built therein to the mobile device 110. For example, the transmitters used by the biometric data generating objects 140 may be Bluetooth transmitters, Bluetooth low energy (BLE) transmitters, etc.

For example, the pair of glasses 140a may include an in-built camera that takes an image of the user 130's retina and sends the image to the mobile device 110. Similarly, the watch 140b may measure the heart rhythm pattern of the user 130 and communicate it to the mobile device. The headphones 140c may include an in-built sensor that measures brain wave, heart rate, etc., of the user and communicates it to the mobile device 110. On the other hand, the shoes 140d measures the gait information of the user and communicates it to the mobile device 110. Additionally, other biometric data generating objects 140 such as a pacemaker, an implantable chip, etc., may also be used by the password-less login system 100 to collect various biometric data about the user 130.

The mobile device 110 includes a biometric data store (BDS) 124 where the biometric data of the user 130 is stored. In one implementation, upon activation of the mobile device 110, it may establish communications with one or more of the various biometric data generating objects 140 and requests current biometric data. The mobile device 110 may also include a biometric data verification module 126 that compares the current biometric data collected from the biometric data generating objects 140 with the existing biometric data. In one implementation, if the current biometric data is different from the data stored in the BDS 124, the mobile device 110 may take one or more action to ascertain that the biometric data collection object 140 is actually used by the user 130 that is related to the mobile device 110. For example, if the retina image communicated by the pair of glasses 140a does not match the retina image stored in the BDS 124, the mobile device 110 may generate a pop-up message to the user 130 on the mobile device 110. Alternatively, the mobile device 110 may send a secure message to the user 130 via a text message, an email, etc. to notify the user 130 of the discrepancy in the biometric data collected from the biometric data collection object 140.

The mobile device 110 may also include a PUF generation module 122 that generates a PUF of the user 130 using the biometric data. In one implementation, the PUF generation module 122 may be configured such that it uses biometric data from at least n number of biometric data generation objects 140, where n may be a number that can be selected by the user 130. For example, the PUF generated as a hash of the retina image of the user 130 and the heart rhythm pattern of the user may be a number that uniquely identifies the user 130. Alternatively, another PUF may be generated based on the retina image of the user 130 and the foot-step pattern of the user 130.

Additionally, the mobile device 110 may also include a device synchronization module 128 that syncs the mobile device 110 with the biometric data generation objects 140 through wireless methods such as Bluetooth, near field communication (NFC), etc., and maintains a user biometrics data Checklist. Furthermore, each of the biometric data generation objects 140 may regularly verify user 130's biometric information at predetermined time intervals and report the verification state to mobile device 110 via the device synchronization module 128. Additionally, the device synchronization module 128 may also wirelessly sync the mobile device with third party device 102 like a laptop 104, a smart car 106, a smart-door 108, etc. Other such third party devices 102 may include a personal computer, an external HDD/SSD, etc. In alternative implementation, the memory 114 may also include a PUF verification module 125. The PUF verification module 125 may compare the current version of PUF with a benchmark PUF for the user 130. For example, the PUF verification module 125 may have a number of alternative versions of benchmark PUFs for the user 130. In such a case, one of such benchmark PUF may be generated using an element of the user 130's identity and two of the biometric data, such as the retina image and the heart rhythm. In an alternative implementation, the benchmark PUF may be generated using the user 130's identity and other two of various user biometric data.

In one implementation, the device synchronization module 128 may sync the third party device 102 with the mobile device 110 upon verifying the user 130's identity by the PUF verification module 125. In one implementation, the device synchronization module 128 may sync the third party device 102 with the mobile device 110 wirelessly or by using a USB cable, a Thunderbolt cable, etc.

In an alternative implementation, a third party device 102 may generate a request to the mobile device 110 to authenticate the user 130 to a website. For example, the laptop 104 may have saved a password for user 130's access to a secure website. In such a case, if the user 130 requests access to a secure website via the laptop 104, the laptop 104 may authenticate the user 130 by sending a user authentication request to the mobile device 110. Subsequently, the mobile device 110 may verify the user 130's PUF and upon successful verification notify the laptop 104 of the user 130's authentication. Subsequently, upon receiving the authentication, the laptop 104 may use the locally stored password to the secure website to give the user 130 access to the secure website without the user 130 having to input the password.

In one implementation, during initiation of a third party device for use with the password-less login system 100, the user 130 may need to use a legacy password to associate such third-party device with the mobile device 110 that manages the PUF. For example, the first time the user 130 initiates the laptop 104 with the password-less login system 100, the mobile device 110 may ask the laptop 104 to send a request to the laptop 104 to sync the laptop 104 with the mobile device 110. In response, the user 130 sends a message from the laptop 104 to the mobile device 110 to ascertain that the user in fact has logged onto the device using legacy password based login method. In such as case, the device sync module 128 of the mobile device adds the laptop 104 to the registry of the third party devices that are accessible via password-less login. Once the laptop 104 is sync'd to the mobile device, on subsequent attempts, upon power on for the laptop, the laptop may send a request to the mobile device for providing user access to the laptop.

Figure 2:
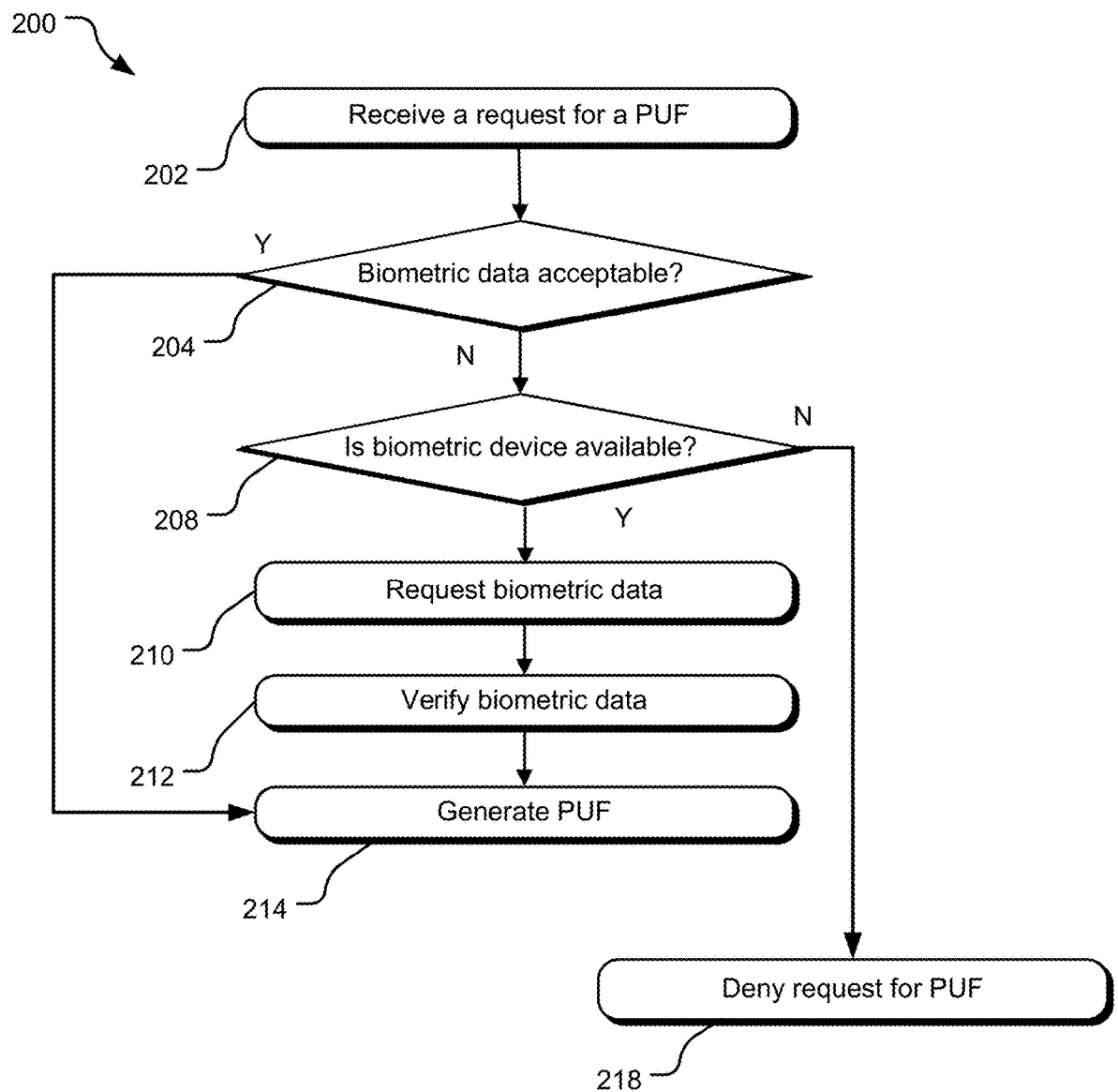
FIG. 2 illustrates an example flowchart for generating a personal unclonable function (PUF).

FIG. 2 illustrates operations 200 for generating a personal unclonable function (PUF). Specifically, the operations 200 may be implemented on the mobile device 110 disclosed in FIG. 1. An operation 202 receives a request for a PUF. For example, such request may be generated by a mobile device in response to a request from a third party device to provide access to a user. In response, an operation 204 may review the biometric data store of a mobile device to determine if the biometric data stored thereon is current and acceptable. If so, it generates a PUF using the current biometric data.

On the other hand, the operation 204 determines that the current biometric data on the store is stale. For example, such determination may be made if the operation 204 determines that the current biometric data on the biometric data store of the mobile device was generated over a predetermined time period ago or during a previous session of the mobile device's communication with various biometric data generating objects. In such a case, an operation 201 requests updated biometric data from one or more biometric data generating objects that are currently available for communication with the mobile device. Subsequently, an operation 212 verifies the newly received biometric data and upon successful verification, generates a PUF at operation 214.

If the operation 208 determines that there are no biometric data generating objects are available, an operation 218 denies the request for the PUF.

Figure 3:
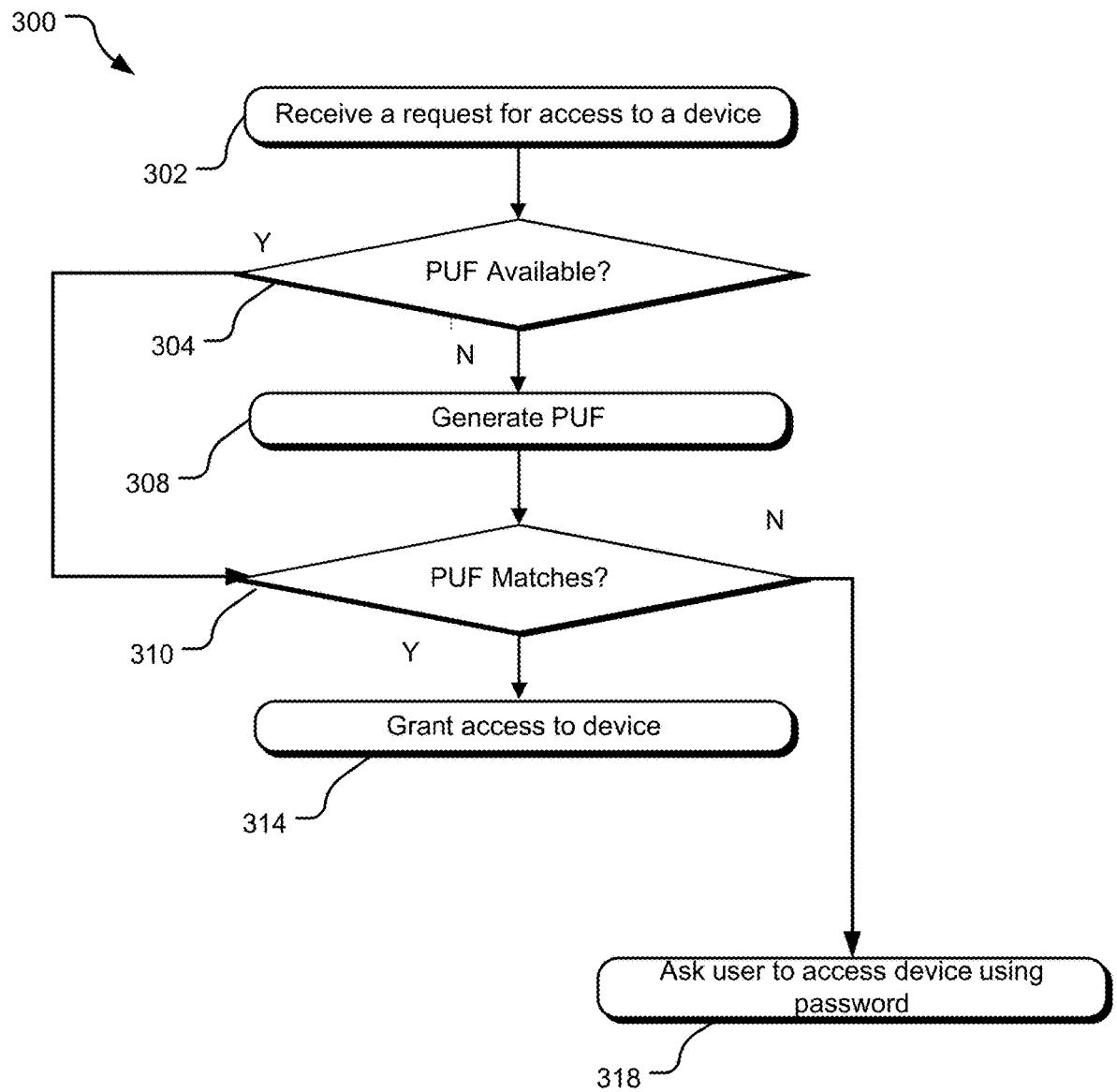
FIG. 3 illustrates an example flowchart for granting a user access to a device using the PUF according to implementations disclosed herein.

FIG. 3 illustrates operations 300 for granting a user access to a third party device using the PUF according to implementations disclosed herein. Specifically, the operations 300 may be implemented on the mobile device 110 disclosed in FIG. 1. An operation 302 receives a request for access to a third party device. In response to the request, an operation 304 determines if a current version of PUF is available. If not, an operation 308 generates a new PUF based on the biometric data of the user. Subsequently, an operation 310 determines if the PUF matches a PUF identifying the user.

If so, an operation 314 grants the user access to the third party device. If the operation 310 determines that the PUF does not match the PUF identifying the user, an operation 318 denies the user's request for access to the third party device.

Figure 4:
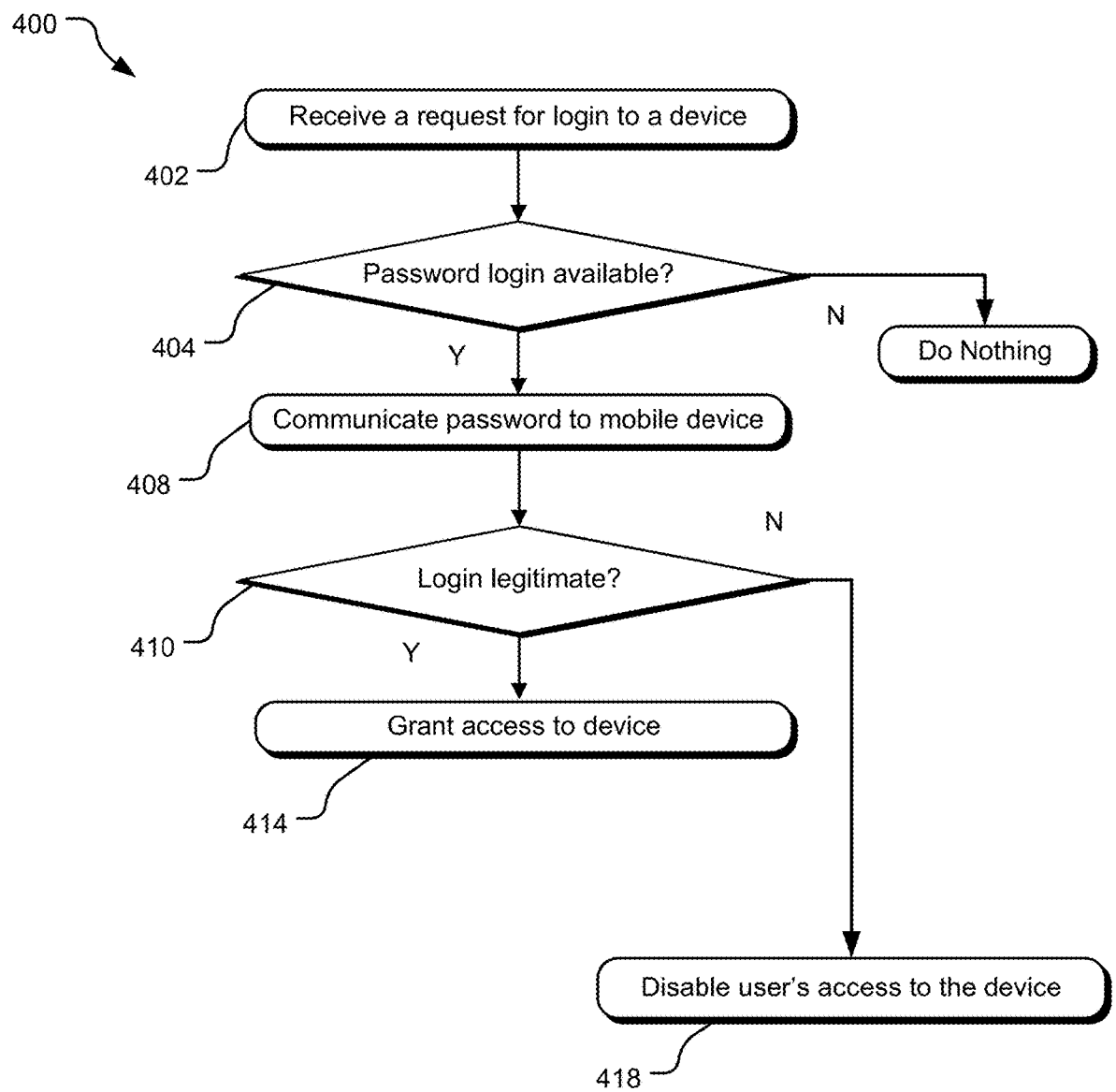
FIG. 4 illustrates an example flowchart of detecting logins to one or more devices configured to be accessed by password-less login.

FIG. 4 illustrates operations 400 of detecting logins to one or more third party devices configured to be accessed by password-less login. Specifically, the operations 400 may be implemented on the mobile device 110 disclosed in FIG. 1. An operation 402 receive a request from a user to login to a third party device. In response, an operation 404 determines if a login using a password is available. If login using a password is available, an operation 408 communicates the password received from the user to the mobile device connected to the third party device. An operation 410 evaluates the password received from the third party device with the password stored at the mobile device with internally stored passwords. If the comparison suggests that the login attempt is legitimate, an operation 414 grants the user access to the device. Alternatively, an operation 418 disables the user's access to third party device.

Figure 5:
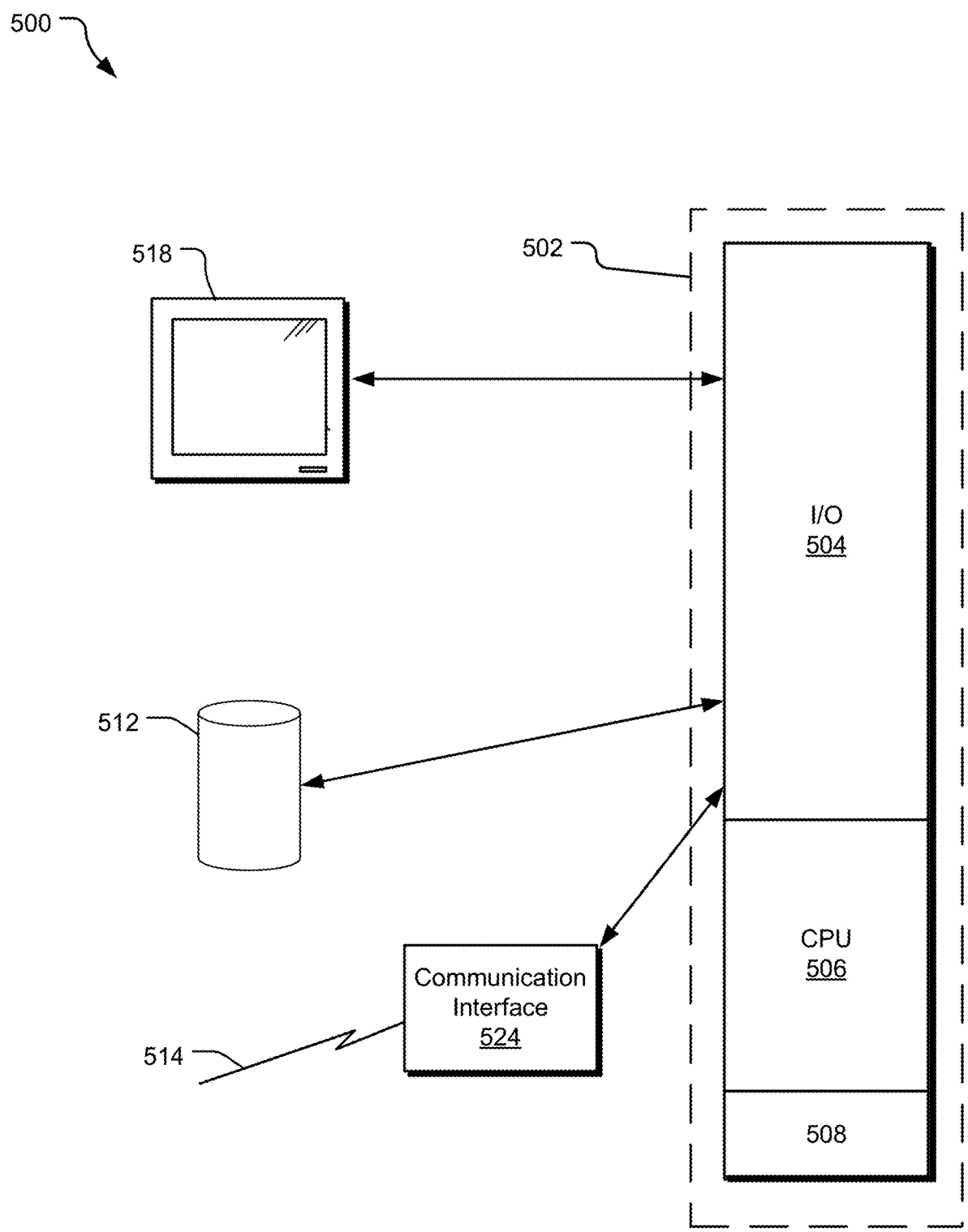
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs, GPUs, or VPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 6:
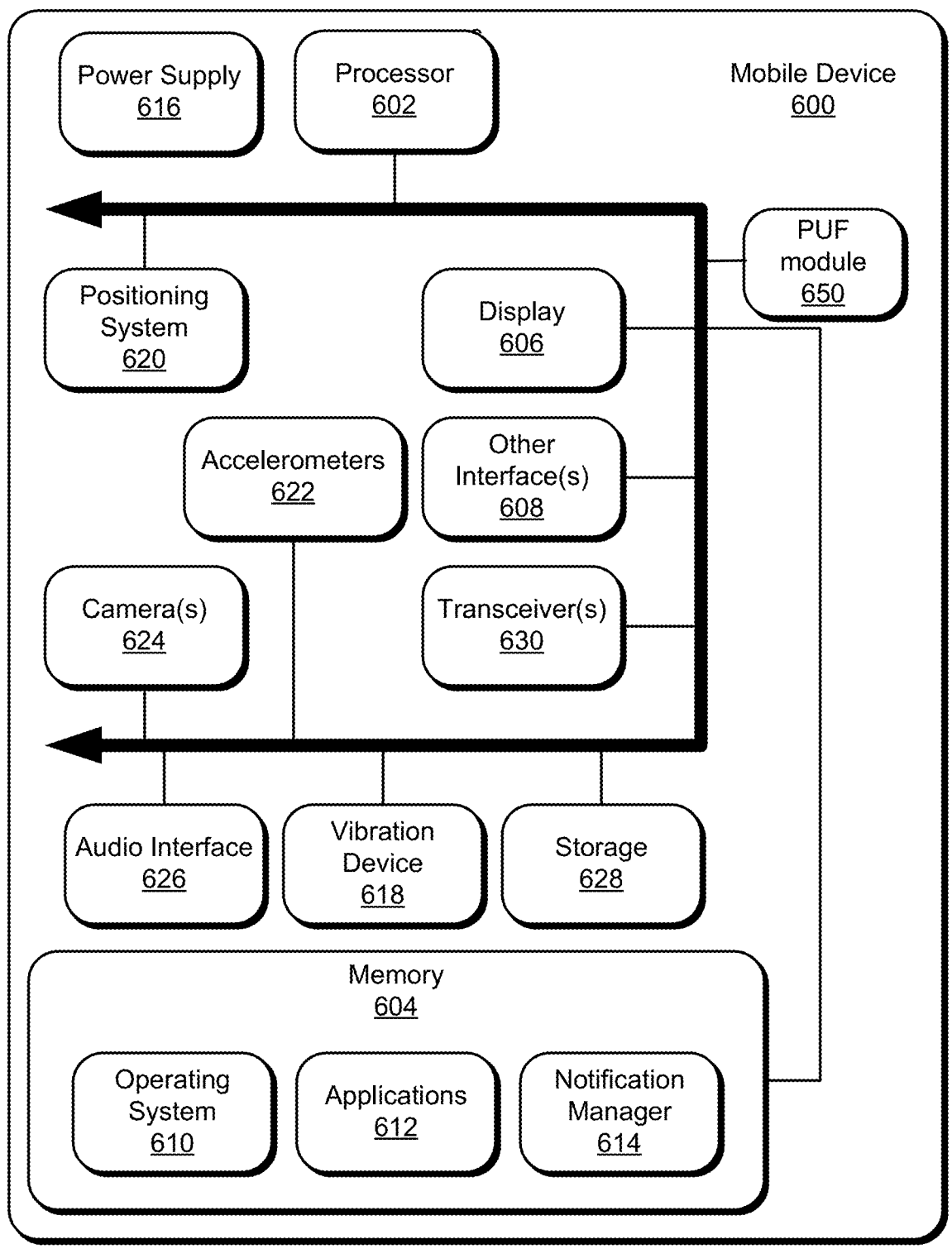
FIG. 6 illustrates an example mobile device that may be used to implement the system disclosed herein.

FIG. 6 illustrates another example system (labeled as a mobile device 600) that may be useful in implementing the described technology. The mobile device 600 includes a processor 602, a memory 604, a display 606 (e.g., a touchscreen display), and other interfaces 608 (e.g., a keyboard). The memory 604 generally includes both volatile memory (e.g., RAM) and non-volatile memory (e.g., flash memory). An operating system 610, such as the Microsoft Windows® Phone operating system, resides in the memory 604 and is executed by the processor 602, although it should be understood that other operating systems may be employed.

One or more application programs 612 are loaded in the memory 604 and executed on the operating system 610 by the processor 602. Examples of applications 612 include without limitation email programs, scheduling programs, personal information managers, Internet browsing programs, multimedia player applications, etc. A notification manager 614 is also loaded in the memory 604 and is executed by the processor 602 to present notifications to the user. For example, when a promotion is triggered and presented to the shopper, the notification manager 614 can cause the mobile device 600 to beep or vibrate (via the vibration device 618) and display the promotion on the display 606.

The mobile device 600 includes a power supply 616, which is powered by one or more batteries or other power sources and which provides power to other components of the mobile device 600. The power supply 616 may also be connected to an external power source that overrides or recharges the built-in batteries or other power sources.

The mobile device 600 includes one or more communication transceivers 630 to provide network connectivity (e.g., mobile phone network, Wifi®, BlueTooth®, etc.). The mobile device 600 also includes various other components, such as a positioning system 620 (e.g., a global positioning satellite transceiver), one or more accelerometers 622, one or more cameras 624, an audio interface 626 (e.g., a microphone, an audio amplifier and speaker and/or audio jack), and additional storage 628. Other configurations may also be employed.

In an example implementation, a mobile operating system, various applications, and other modules and services may be embodied by instructions stored in memory 604 and/or storage devices 628 and processed by the processing unit 602. User preferences, service options, and other data may be stored in memory 604 and/or storage devices 628 as persistent datastores. A PUF module 650 communicatively connected with the processor 602 and the memory 604 may enable one or more of the capabilities of the antenna sharing system disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
one or more biometric data collection objects; and
a mobile device configured to:
store one or more user identification data;
receive a request for user verification;
request user's biometric data from one or more of the biometric data collection objects;
generate a personal value based on combination of at least one of the user identification data and the user's biometric data;
verify the user's identity by comparing the personal value to the user's personal benchmark;
synchronize a third party device with the mobile device in response to verification of the user's identity;
receive a password for access to the third party device;
verify the password; and
in response to false verification of the password, disable the third party device.

2. The system of claim 1, wherein the biometric data collection objects include a pair of glasses and the biometric data is an image of retina of the user.

3. The system of claim 1, wherein the mobile device is further configured to generate the personal value based on at least two of the biometric data of the user.

4. The system of claim 1, wherein the mobile device is a phone that communicates with the one or more of the biometric data collection objects using at least one of WiFi and Bluetooth.

5. The system of claim 1 wherein the mobile device is further configured to request updated biometric data from the one or more of the biometric data collection objects in response to determining that existing biometric data is older than at least a predetermined amount of time.

6. The system of claim 1, wherein the mobile device is further configured to store biometric data about the user and in response to receiving updated biometric data, verifying the updated biometric data before generating the personal value.

7. The system of claim 1 wherein the mobile device is further configured to synchronize the personal with the third party device wirelessly or via a USB cable.

8. One or more non-transitory processor-readable storage media encoding processor-executable instructions for executing on a computer system a computer process, the computer process comprising:
storing one or more user identification data on a mobile device;
receiving a request for user verification at the mobile device;
requesting user's biometric data from one or more biometric data collection objects;
generating a personal value based on combination of at least one of the user identification data and the user's biometric data;

verifying the user's identity by comparing the personal value to the user's personal benchmark;

synchronizing a third party device with the mobile device in response to verification of the user's identity;

receiving a password for access to the third party device;

verifying the password; and in response to false verification of the password, disabling the third party device.

9. The one or more processor-readable storage media of claim 8, wherein the biometric data collection objects include a pair of glasses and the biometric data is an image of retina of the user.

10. The one or more processor-readable storage media of claim 8, wherein the biometric data collection objects include a watch and the biometric data is a heart rhythm of the user.

11. The one or more processor-readable storage media of claim 8, wherein generating the personal value further comprising generating the personal value based on at least two of the biometric data of the user.

12. The one or more processor-readable storage media of claim 8, wherein the mobile device is a phone that communicates with the one or more of the biometric data collection objects using at least one of WiFi and Bluetooth.

13. The one or more processor-readable storage media of claim 8, further comprising storing biometric data about the user and in response to receiving updated biometric data, verifying the updated biometric data before generating the personal value.

14. A system comprising:
one or more processors;
a memory configured on a mobile device;
one or more biometric data collection objects; and
a password-less login module stored in the memory and executable by the one or more processors to support password login for a user, the password-less login module configured to:
store one or more user identification data;
receive a request for user verification;
request user's biometric data from one or more of the biometric data collection objects;
generate a personal value based on combination of at least one of the user identification data and the user's biometric data;
verify the user's identity by comparing the personal value to the user's personal benchmark;
synchronize a third party device with the mobile device in response to verification of the user's identity;
receive a password for access to the third party device; and
in response to false verification of the password, disabling the third party device.

15. The system of claim 14 wherein the one or more biometric data collection devices includes a shoe configured to collect biometric information from the user, an eye glass configured to collect biometric information from the user, and a watch configured to collect biometric information from the user.

16. The system of claim 15 wherein the password-less login module is further configured to generate the personal value based on at least two of the biometric data of the user.

17. The system of claim 15 wherein the password-less login module is further configured to request updated biometric data from the one or more of the biometric data collection objects in response to determining that existing biometric data is older than at least a predetermined amount of time.

* * * * *